Patented Oct. 5, 1948

2,450,439

UNITED STATES PATENT OFFICE 2,450,439

METHOD OF CLEANING DRIED ZIRCONIA GEL PRODUCTION EQUIPMENT

Thomas H. Milliken, Jr., Rose Valley, Pa., assignor to Houdry Process Corporation, Wilmington, Del., a corporation of Delaware No Drawing. Application June 26, 1945, Serial No. 601,722

8 Claims. (Cl. 134—13)

1

The present invention relates to methods for the cleaning of equipment employed in the production of zirconia gels in the dried state.

Dried zirconia gel is a catalyst and is also employed in the synthetic catalysts which have been developed in recent years which are useful in hydrocarbon conversion processes, such as vapor phase and liquid phase cracking of hydrocarbon oils, in the so-called second pass treatment of gasoline under cracking conditions, and in the polymerization of olefin hydrocarbons. Some of the catalysts for these uses contain silica and zirconia and, if desired, other materials such as alumina or beryllia.

In the manufacture of such catalysts, a hydrogel containing silica and zirconia is prepared and dried. A tenacious film containing zirconia is formed upon the drying equipment with which the gels are in contact during drying. The removal of this film is of particular importance in connection with casting equipment. Thus, in the manufacture of zirconia catalysts containing silica the hydrogel is dried to the dry gel state and purified by washing either before or after the drying of the hydrogel. The gel is then ground and a paste prepared from the dried ground gel by the addition either of water or undried hydrogel. The paste is charged to casting plates and cast in openings which extend through the plates. The plates are then passed to a drier wherein the paste is dried, following which, the catalyst pieces are discharged from the molding openings in the plates. During use, it has been found that a film forms upon the surface of such plates, which film interferes with subsequent use of the plates for casting operations, since it prevents discharge of subsequently formed pieces from the plates.

Objects of the present invention are to clean drying equipment used for the drying of zirconia gels, to regenerate the cleaning material, and to reclaim the zirconia removed during the cleaning.

In accordance with the present invention drying equipment employed for the drying of a zirconia gel is cleaned by washing it with a caustic solution containing silica dissolved therein at a temperature below 70° C. Removal of the film containing zirconia is preferably effected at a temperature above 50° C. in order to obtain the most rapid removal of the film. In order to reclaim the zirconia, the temperature of the cleaning solution is increased to above 70° C. whereby in a short time a precipitate containing substantially all the zirconia is obtained. Following precipitation of the zirconia from the solution, the

2 solution may again be used in the cleaning operation.

The solution employed may be of any suitable caustic alkali, such as caustic soda or caustic potash. The concentration of caustic in the cleaning solution is not critical, though preferably I employ a solution of concentration between about 5% and about 20%. Higher concentration of the caustic does not appear to improve the results obtained. In this solution there is maintained a minimum of one gram of dissolved silica per 100 cc. of solution. This silica is preferably added as a soluble silicate, such as sodium silicate, before cleaning operations commence in order to prevent the reprecipitation or recoagulation of the zirconia upon the drying equipment, as occurs with a solution of caustic not stabilized with silica. Thus, the silica stabilizes the colloidal dispersion of the zirconia in the caustic solution. However, in case the gel contains both silica and zirconia, cleaning operations may be commenced with a solution of caustic, allowing reprecipitation of the zirconia to occur. The silica of the gel will be retained in the caustic solution, in such an operation, and in due course will rise to a concentration above 1 gram per 100 cc. of solution. Thereafter reprecipitation of the zirconia is avoided.

In case continuous washing operations are contemplated, it is desirable to remove the washing solution periodically or continuously and replace the used solution with a fresh solution. This is due to the fact that after a period zirconia will reprecipitate from caustic, stabilized with a soluble silicate in accordance herewith. Thus, with a 10% caustic soda solution containing 2.5 grams of silica per 100 cc. of solution, in which there has been dissolved 4 grams per 100 cc. of a silica-zirconia gel containing 90% silica and 10% zirconia, the zirconia will reprecipitate after 250 minutes at 70° C.

The cleaning solution withdrawn as above indicated, is regenerated by precipitation or coagulation of the zirconia therefrom. This may be effected by allowing the solution to stand for an adequate time. However, the precipitation preferably is accelerated by heating the solution to above 70° C., preferably to above 90° C., in which temperature range rapid precipitation of the zirconia occurs. After precipitation the solution is again in condition for use.

*Example*

Stainless steel casting plates were employed for the casting and drying of a silica-zirconia plural gel in the form of paste made from dried gel containing 90% silica and 10% zirconia. The plates were used repeatedly in this manner. Between each casting and drying operation the plates were cleaned with a 10% caustic soda solution containing 3.6 grams of silica dissolved therein per 100 cc. of solution. The temperature was maintained at 65° C. The plates were immersed in the solution under these conditions for 30 seconds. The plates remained clean permanently. The cleaning solution was regenerated periodically. To do this it was removed from the cleaning zone, heated to 100° C. to precipitate the zirconia, and returned for reuse. Some of the silica likewise was simultaneously precipitated in the regenerating operation. For purposes of comparison, similar plates were used for the same purpose, and in the same manner were washed with a 10% caustic soda solution at 65° C., but containing no silica. The plates were immersed in the caustic soda solution for 30 seconds. A fresh caustic solution was employed for each cleaning operation. After 80 fills with the gel, together with cleaning between each fill, a thick translucent film was formed on the surface of the plates. There was accordingly some solvent action, primarily on the silica, though it was not sufficient to prevent a cumulative deposit from forming. Eventually, if the caustic soda solution had not been changed, enough silica could have been built up in the caustic soda solution by the washing operation to effect stabilization.

While reference has been made herein to solution of zirconia in caustic soda solutions, it should be understood that this invention is not limited to a true solution of this material, inasmuch as, theoretically, probably it is not in the form of a true solution. It is probably present as a dispersed colloid which coagulates under the conditions indicated.

I claim as my invention:

1. The method of cleaning equipment which has been employed in contact with a zirconia gel during the drying of said gel which comprises washing said equipment with a caustic alkali solution containing at least one gram of dissolved silica therein per 100 cc. of solution at a temperature below 70° C.

2. The method of cleaning equipment which has been employed in contact with a zirconia gel during the drying of said gel which comprises washing said equipment with a caustic alkali solution containing at least one gram of dissolved silica therein per 100 cc. of solution at a temperature below 70° C. and regenerating the caustic solution by effecting coagulation of the zirconia and by removing the coagulated zirconia from the solution.

3. The method of cleaning equipment which has been employed in contact with plural gels containing silica and zirconia during the drying of said gels which comprises washing said equipment with a caustic alkali solution containing at least one gram of dissolved silica therein per 100 cc. of solution at a temperature below 70° C.

4. The method of cleaning equipment which has been employed in contact with plural gels containing silica and zirconia during the drying of said gels which comprises washing said equipment with a caustic alkali solution containing at least one gram of dissolved silica therein per 100 cc. of solution at a temperature below 70° C. and regenerating the caustic solution by heating the solution to accelerate coagulation of the zirconia and by removing the coagulated zirconia from the solution.

5. The method of cleaning equipment which has been employed in contact with a zirconia gel during the drying of said gel which comprises washing said equipment at a temperature below 70° C. with a solution containing about 5 to 20 per cent of caustic alkali and at least 1 gram of dissolved silica per 100 cc. of solution.

6. The method of cleaning equipment which has been employed in contact with a zirconia gel during the drying of said gel which comprises washing said equipment at a temperature below 70° C. with a solution containing about 5 to 20 per cent of caustic alkali and at least 1 gram of dissolved silica therein per 100 cc. of solution, and regenerating the caustic solution by effecting coagulation of the zirconia and removing the coagulated zirconia from the solution.

7. The method of cleaning equipment which has been employed in contact with plural gels containing silica and zirconia during the drying of said gels which comprises washing said equipment at a temperature below 70° C. with a solution containing about 5 to 20 per cent of caustic alkali and at least 1 gram of dissolved silica therein per 100 cc. of solution.

8. The method of cleaning equipment which has been employed in contact with plural gels containing silica and zirconia during the drying of said gels which comprises washing said equipment at a temperature below 70° C. with a solution containing about 5 to 20 per cent of caustic alkali and at least 1 gram of dissolved silica therein per 100 cc. of solution, regenerating the caustic solution by heating the solution to accelerate coagulation of the zirconia and removing the coagulated zirconia from the solution.

THOMAS H. MILLIKEN, Jr.

REFERENCES CITED

The following references are of record in the file of this patent:

UNITED STATES PATENTS

| Number | Name | Date |
| --- | --- | --- |
| 2,272,301 | Kinneberg | Feb. 10, 1942 |
| 2,303,400 | Schwartz | Dec. 1, 1942 |
| 2,382,165 | MacMahon | Aug. 14, 1945 |